Figure 1:
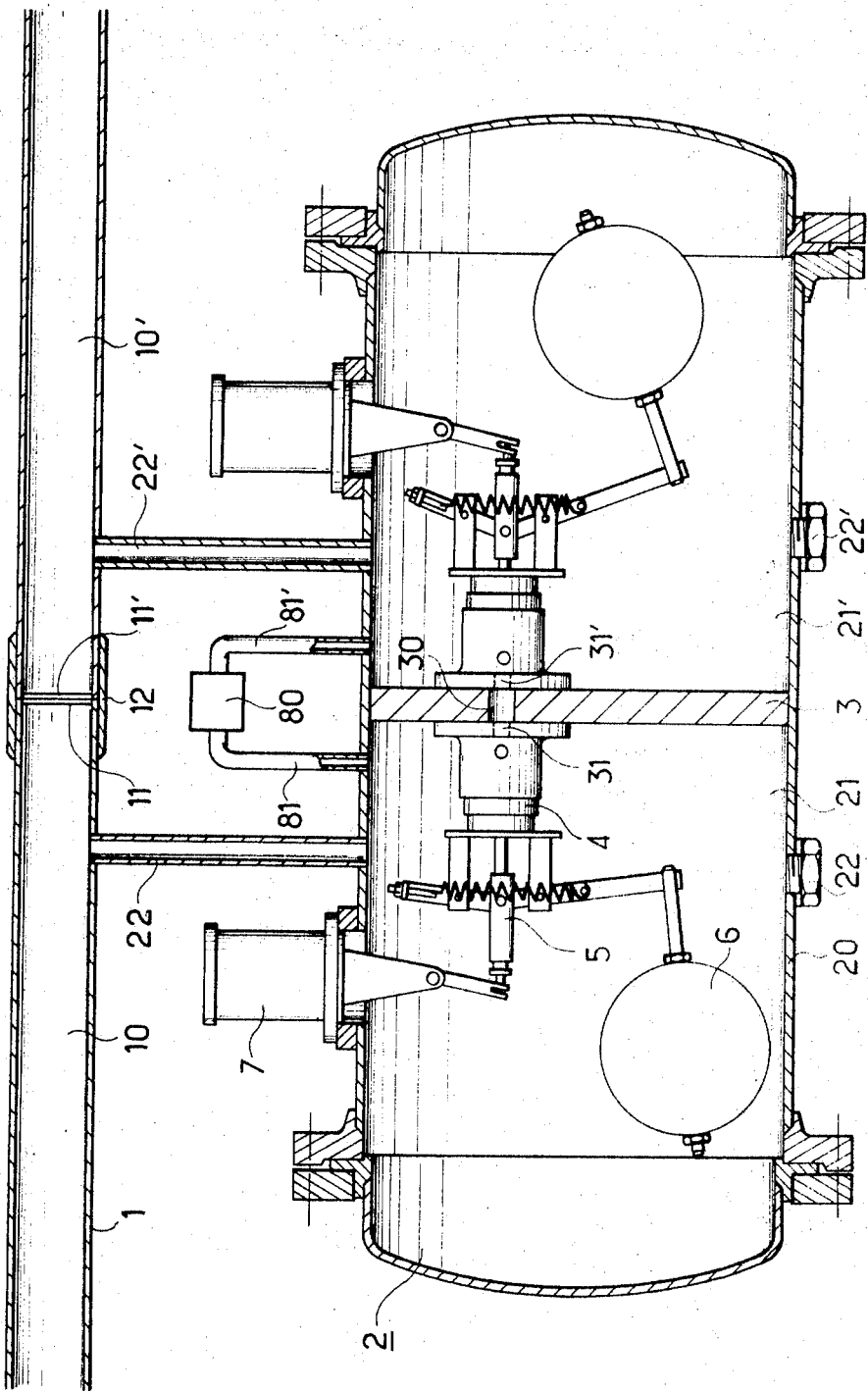

United States Patent [19]
Bendayan et al.

[11] 3,745,491
[45] July 10, 1973

[54] AUTOMATIC VALVE FOR PIPE LINES UNDER GAS PRESSURE

[75] Inventors: Jacques Bendayan; Jean Duret, both of Lyon; Roger Cartet, Villefranche-sur-Saone, all of France

[73] Assignee: Cables De Lyon-Alsacienne-Geoffroy. Delore, Lyon, France

[22] Filed: Mar. 30, 1972

[21] Appl. No.: 239,667

[52] U.S. Cl. .................... 333/98, 137/192, 137/423, 137/614.21
[51] Int. Cl. ............................................. H01p 1/30
[58] Field of Search ............... 137/192, 423, 614.21, 137/493.9; 333/98 P

[56] References Cited
UNITED STATES PATENTS
2,602,858   7/1952   Hartley .......................... 333/98 UX
3,209,738   10/1965  Powers ........................... 137/192 X Primary Examiner—Alan Cohan
Attorney—Paul M. Craig, Jr., Donald R. Antonelli and David H. Hill

[57] ABSTRACT

An automatic gate valve for interrupting the communication between two pipe line sections which are under the pressure of gas in case there is a propagation or infiltration of liquid from one section toward the other, characterized in that it consists of an enclosure which is subdivided vertically by means of a wall into two compartments, each compartment being connected to one of said pipe sections with which it is associated, the compartments being interconnected by means of a calibrated passage terminating at each end in an orifice positioned opposite a closing device controlled through connecting means by a respective floating element in each compartment in response to an accumulation of liquid within the corresponding chamber.

10 Claims, 3 Drawing Figures

AUTOMATIC VALVE FOR PIPE LINES UNDER GAS PRESSURE

The present invention relates to an automatic valve for pipe lines systems which are under gas pressure, and more particularly, to the application of automatic valves to pipe lines or network connections consisting of lines of waveguides.

It is known that waveguides consist either of a smooth metallic tube which may, or may not, be insulated at the inside thereof, or of an insulated wire wound with a very tight pitch to produce a cylindrical unit, which unit is then enclosed with or surrounded by metallic and dielectric screens. At the interior of the unit, an appropriate gaseous fluid is provided, such as dry air or nitrogen.

The interest in use of such lines of wave guides resides in the possibility of transmitting therethrough simultaneously a considerable number of telecommunications over a large distance, in the order of several hundred miles and more, at very high frequencies, for example, in the gigaHertz range.

Under these conditions, the maintenance of a line is of fundamental importance since the disturbances and discontinuities in the structure of these metallic lines which may be produced during the formation and use thereof are related in direct proportion to the performance of such a line. Therefore, it appears expedient to place such lines under a mechanical protection and out of reach of external forces by burying them rather deeply in the ground.

Nevertheless, these lines still remain vulnerable since slight manufacturing defects, or also mechanical accidents which may happen unexpectedly to the lines within the ground entail the risk of producing leaks of gaseous fluid and/or of making possible the infiltration of water or liquids into the very interior of the waveguide. Such infiltrations are undesirable since they affect in certain cases an important portion of the pipe line and thereby render it unusable. In addition thereto, the maintenance of the fluid-tightness and the tracing of defects in the line are particularly difficult when the line is very long.

It is the object of the present invention to provide for a valve or gate which, without changing the free gaseous circulation that is necessary to maintain the pressure in the pipe lines, limits the effects of the accidental penetration of water or of another fluid therein. It may also allow for effecting control over the fluid-tightness of the pipe line, as well as tracing any possible defects therein.

The present invention is directed to an automatic valve for interrupting the communication between two adjacent pipe line sections maintained under gas pressure and is characterized in that it comprises an enclosure subdivided by means of a wall into two compartments, each connected to one of said line sections, said compartments being interconnected by means of a calibrated passage which terminates on respective sides in an orifice placed opposite a respective closing device which is controlled through connecting means by a floating element actuated in the presence of a liquid accumulation in the corresponding compartment.

According to one embodiment of the present invention, the closing device is a valve whose seat comprises the orifice of the calibrated passage. The connecting means comprises a knee joint equipped with a spring for assuring the accelerated forceful closing which is in conformity with the pressures prevailing in the pipe line. The connecting means are linked to respective signaling blocks which may provide for remote indication of operation of the closing valve.

According to a further feature of the invention each compartment is equipped with a pressure intake arrangement, the respective pressure intake arrangements being connected to a differential pneumatic apparatus. Each compartment is also equipped at the lower portion thereof with a suitable draining device.

According to a still further feature of the invention, the pipe lines are provided as sections of lines of waveguides under gas pressure interconnected by means of a junction which comprise an internally disposed membrane which is impermeable to the passage of fluids, but permeable to the electric waves being transmitted by the guide.

Figure 2:
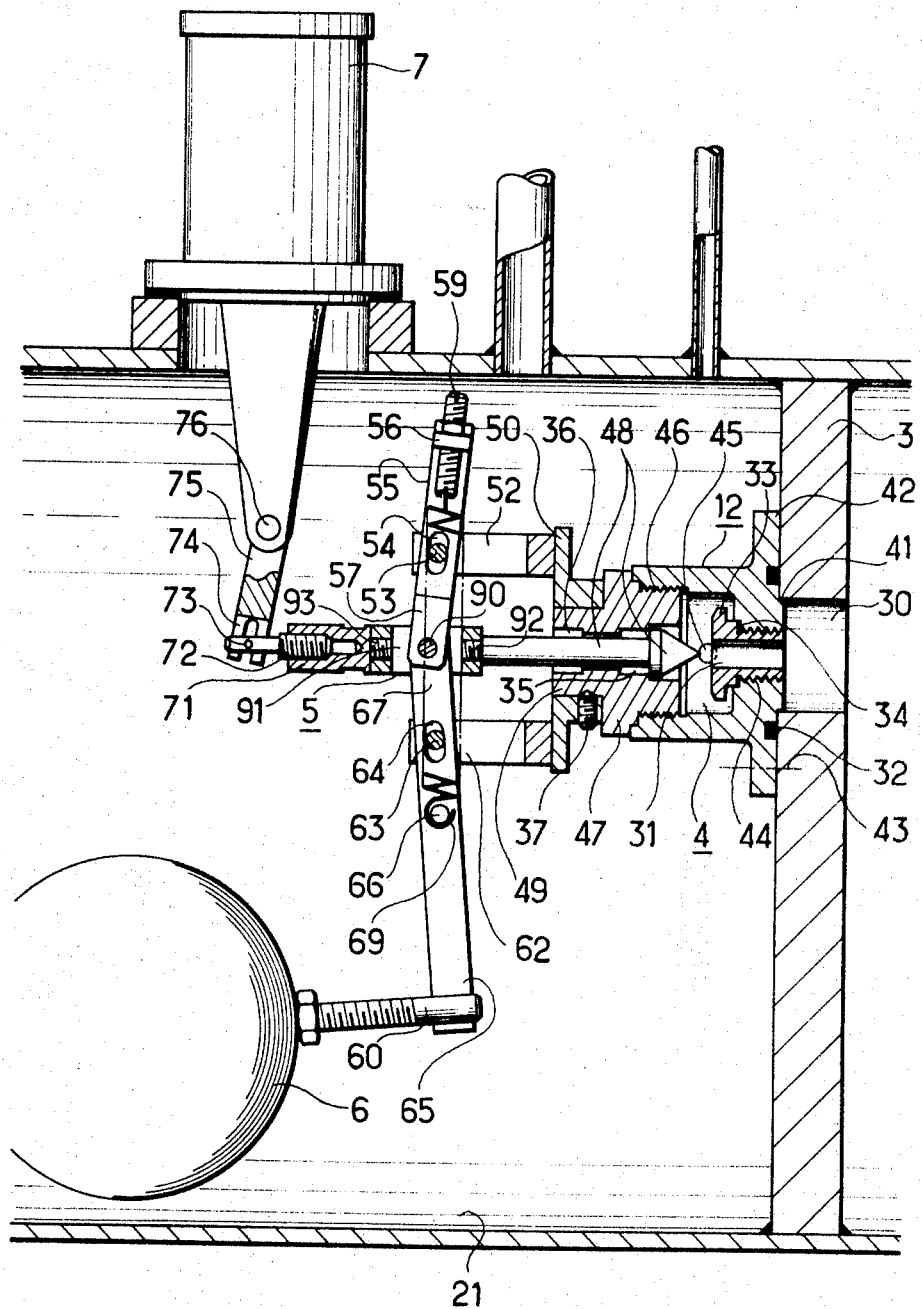
Figure 3:
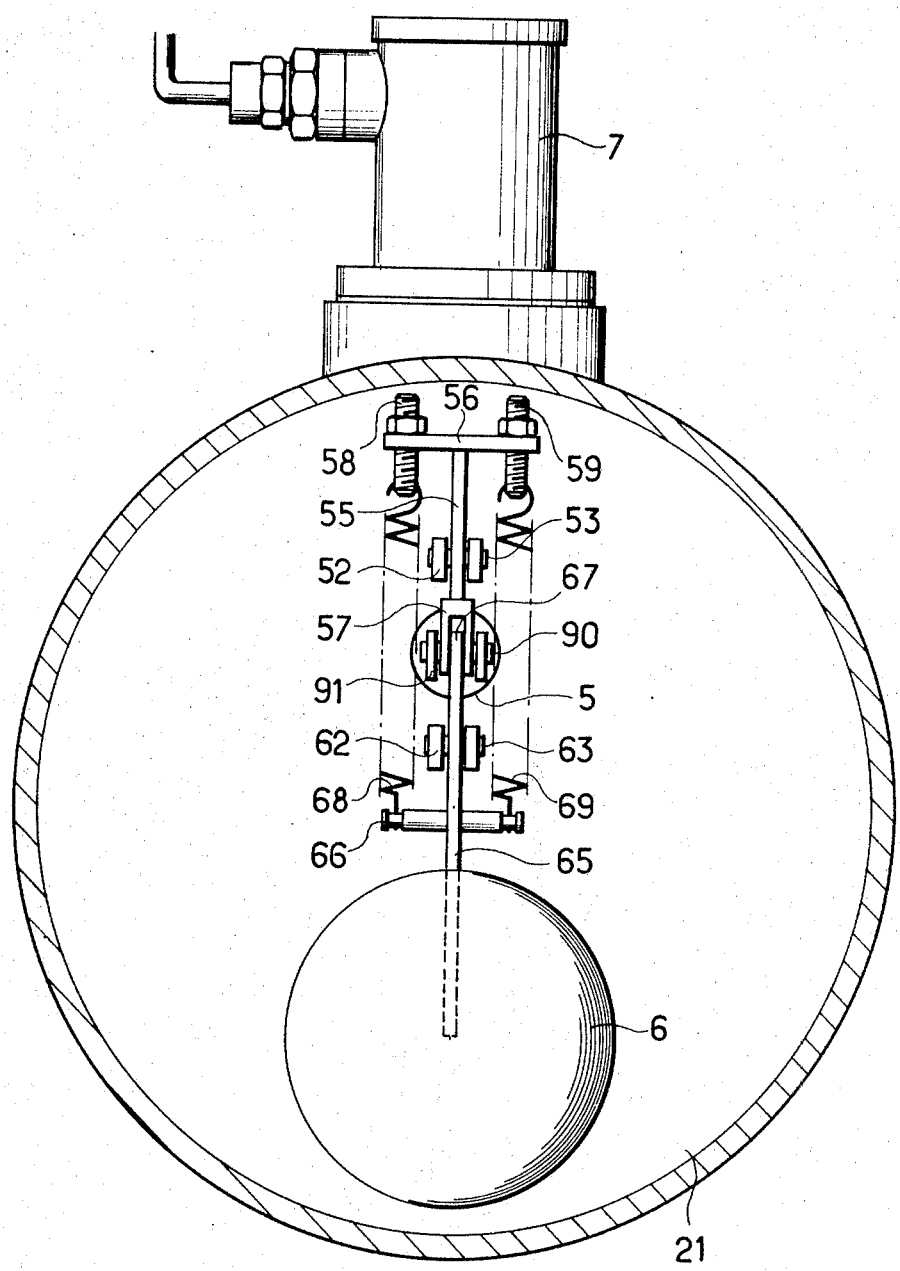

The characteristics and advantages of the present invention will become more apparent from the following description which relates to one embodiment of the present invention as illustrated in the accompanying drawings, wherein FIG. 1 is a schematic view of the entire slide valve or gate unit as proposed by the present invention;

FIG. 2 is a detailed elevation, in cross section, of a preferred embodiment of a closing device consisting of a valve and connecting means, and FIG. 3 is a partial cross-sectional view taken along line XY of the connecting means in FIG. 2.

In FIG. 1 reference numeral 1 identifies a waveguide line maintained under gas pressure and consisting of sections, such as 10 and 10', whose adjacent ends are closed by membranes 11 and 11', the junction being sealed by a sleeve 12.

The automatic gate valve, which is illustrated in detail in FIG. 2, consists of a fluid-tight enclosure 20 separated by means of a wall 3 into two compartments 21 and 21', which are connected by means of auxiliary lines 22 and 22', respectively, to the sections 10 and 10' with which they are in operative engagement. The two compartments are also interconnected by means of a calibrated passage 30 terminating on respective sides thereof at an orifice 31 in the compartment 21 and at the orifice 31' in the compartment 21'.

Since the two compartments are made in an identical manner, only the compartment 21 will be described in detail. In compartment 21 the orifice 31 is disposed opposite a closing member 4 which is in operative connection with the floating element 6 by means of a connecting means 5. This same linking or connecting means 5 is also in operative engagement with a signaling block 7.

The compartment 21 moreover comprises a draining device 25 and an auxiliary tap 81 for sampling the intake pressure in compartment 21 for a differential pneumatic apparatus 80, which in turn is also connected to the auxiliary tap 81' to sample the intake pressure of the compartment 21'.

The operation of this unit proceeds generally as follows. When an infiltration of liquid, for example water, occurs in the pipe line section 10, this water eventually penetrates into the compartment 21 by way of the auxiliary line 22, accumulates in the lower portion of the compartment and exerts a lifting pressure upon the floating element 6. The connecting means linking the floating element to the closing device 4 will actuate the latter in a manner to close the orifice 31, and the communication between the compartment 21 and the compartment 21' is thus interrupted; hence, the latter is protected from the penetration of any water coming from the section 10.

Conversely, if the infiltration of liquid occurs in the section 10', it is the closing device 4' of the compartment 21' which is actuated to effect the closing of the orifice 31', thereby protecting the section 10.

Finally, the connecting means 5 are also linked to respective signaling blocks 7, from which the warning or alarm signal to effect a tracing of the problem in question may be transmitted over a long distance by conventional means which have not been shown in the drawings.

In view of the fact, moreover, that the pipe lines are intended by their very nature to be kept under gas presusre, when there exist in either one or several pipe lines sections slight leaks of gas due to defects of construction, or perhaps leaks resulting from accidental causes, without however being necessarily accompanied by a penetration of liquid, these leaks give rise to an abnormal flow of gas from one section toward the other which may be detected and controlled. Thus, when a leak of gas is produced in section 10', for example, the section 10 discharges gas toward the section 10' through the gate valve 4. The discharge of gas through the calibrated passage 30 then causes a loss of pressure which is transmitted to the differential pneumatic apparatus 80 through the auxiliary intake pressure lines 81 and 81'. If, on the other hand, the leak is produced and takes place on section 10, it is the section 10' which will discharge gas toward the section 10, and the discharge of gas through the same calibrated passage 30 will then cause a loss of pressure in the opposite direction.

The differential pneumatic apparatus, which may be of any appropriate type, such as a manometer or manual contactor, makes it possible to obtain data relative to the direction of the gas flow from one section toward the other through the calibrated passage 30 of the gate valve and to determine the amount of the pressure deviation and its location. It may even act to energize a teletransmission line to provide a remote indication of the fault.

It is thus apparent that such a gate valve makes it possible to obtain a protection of the various sections constituting the waveguide line in case of any possible penetration of liquids into the interior thereof and in this case, as well as in the presence of simple gas leaks, one obtains moreover directional indications relative to the direction of the gas flow caused by a fault and, as a consequence, the location thereof.

It is understood that the preceding disclosure directed specifically to pipe lines forming waveguides is valid also for other types of pipe lines which are designed to be kept under gas pressure, or even to lines used exclusively for the transport of gas.

In FIG. 2 reference numeral 3 identifies the interior wall or partition defining one side of a compartment 21, and reference numeral 4 indicates generally the closing device which consists of a gate valve for controlling flow through the passage 30. The gate valve 4 is mounted at the cylindrical opening 30 in which there will come to be positioned the shoulder portion 41 of a fastening bushing 42 when the valve 4 is secured in place on the partition wall 3 by means of a set of screws 43. This unit is rendered fluid-tight by virtue of the interposition of a fluid-tight sealing ring 32 between the bushing 42 and the partition wall. Provided in the bushing 42 is a central opening equipped with a threaded bore 44 into which a seat 33 is screwed in a fluid-tight manner by virtue of the interposition of a sealing ring 34. The seat 33 is provided with an axial calibrated opening forming an orifice 31. The bushing 42 is equipped on the side thereof with a transverse cylindrical opening 45 which provides communication between the compartment 21 and the interior chamber of valve 4. A threaded bore 46 is provided at the end of the valve 4 opposite the bore 44 into which is screwed a guiding ring 47 of a needle valve 48 gliding on two self-lubricating rings 35 and 36.

In FIGS. 2 and 3 reference numeral 5 has been used to designate the entirety of the connecting means provided between the floating element 6 and the closing device 4, on the one hand, and the signaling block 7, on the other hand. This connecting unit consists of a fixed portion comprising a bushing 50 which is secured to the cylindrical bottom or base 49 of the ring 47 by means of a locking screw 37. Welded onto this bushing 50 are an upper clamp 52 supporting a fixed axle 53 and a lower clamp 62 supporting a fixed axle 63.

Disposed on the axle 53 by way of an elongated opening 54 for gliding movement and articulation is an upper connecting rod 55 carrying on the upper part thereof a transverse lug portion 56 and on the lower part thereof the jaws of a yoke 57 having a threaded bore. Disposed on the axle 63 by way of an elongated opening 64 for gliding movement and articulation is a lower connecting rod 65 carrying on the lower part thereof a transverse axle 66 and on the upper part thereof a connecting end 67 having a threaded bore.

Mounted to the lug portion 56 are two adjustable screws 58 and 59 which respectively hold one end of springs 68 and 69, the other ends of which are coupled to the axle 66.

The jaws of the yoke 57 and the connecting end 67 are connected together with the aid of an axle 90, to which the jaws of a cap 91 are also connected. This cap 91 is equipped transversely at one end with a threaded bore 92 into which the threaded end of the needle valve 48 is screwed. The other end of the cap 91 is provided with another threaded bore 93 into which a sleeve 71 is screwed.

Screwed into the sleeve 71 is a finger 72 equipped with a drive shaft 73 coupled with a fork portion 74 of a connecting rod 75 pivotable about a fixed axle 76 which is supported by the signaling block 7. On the other hand, the floating element 6 is equipped with a threaded rod 60 which, in turn, is welded onto the lower portion of the connecting rod 65.

The operation of the units described with reference to FIGS. 2 and 3 is as follows. When liquid accumulated in the lower portion of the compartment 21, the floating element 6 is subjected to a pressure directed upwardly. This pressure is transmitted to the movable shaft 90 as the lower connecting rod 65 is articulated around the fixed point of axle 63. When the torque is greater than the opposing force exerted by the springs 68 and 69, the movable shaft 90 is displaced toward the right according to the direction imposed by the guiding ring 47 of the needle valve 48. The lower connecting rod then turns about the fixed point of axle 63, which glides in the opening 64; and symmetrically, the upper connecting rod 55 turns about the fixed point of axle 53, which glides in the opening 54.

During this displacement of the movable rod 90 toward the right, the opposing torque exerted by the springs 68 and 69 will be progressively reduced and become zero at the moment of the alignment of this axis with the fixed points 53 and 63. Once this alignment is exceeded, the torque exerted by the springs will be superimposed to an increasing extent over that exerted by the floating element 6. The unit of connecting rods 55 and 65, and the axle 90 will then constitute a knee joint whose axis of articulation 90 assumes an accelerated movement toward the right, taking along the cap 91.

The cap 91 forcefully applies the end of the needle valve 48 against the orifice 31 of the seat 33 with which it forms a stop valve, the closing of which prevents in that case any penetration of liquid through the passage 30 of the partition wall 3.

On the other side of the valve 4, the cap 91 drives, by means of the sleeve 71, the finger 72 whose axis 73 causes the fork 74 of the connecting rod 75 to flip-flop around the fixed axle 76. This being done, the end of the connecting rod 75 opposite the fork 74 (not shown) actuates contacts (not shown) of the signaling block 7 which may be connected to a teletransmission line for remote signaling.

The present invention is not limited to the examples and embodiments which have been described herein; rather, it is susceptible to any changes and modifications which appear from this disclosure suitable to one skilled in the art.

What is claimed is:

1. An automatic gate valve for interrupting the communication between two adjacent sections of pipe under gas pressure in response to the infiltration of water from one section toward the other, comprising a fluid-tight enclosure divided by a partition wall into first and second compartments, said partition wall having a calibrated passage therein providing communication between the compartments, first and second closing means disposed respectively in said first and second compartments for selectively closing said calibrated passage from respective sides thereof, and actuating means in each compartment responsive to the level of liquid therein for actuating said respective first and second closing means.

2. An automatic gate valve as defined in claim 1 wherein each closing means includes a stop valve whose seat is formed by the orifice of said calibrated passage.

3. An automatic gate valve as defined in claim 2 wherein each actuating means includes a float element and a spring biased lever arrangement connecting said float element to said stop valve.

4. An automatic gate valve as defined in claim 3 wherein said spring biased lever arrangement comprises first and second connecting rods pivoted together at first ends thereof and pivotally connected intermediate the ends thereof to individual support means and at least one spring interconnecting points on said connecting rods on the side of said intermediate pivot points opposite said first ends, said float element being connected to the free end of one of said connecting rods, and said closing means including a needle valve connected at one end to the interconnected first ends of said first and second connecting rods.

5. An automatic gate valve as defined in claim 4 and including signaling means connected to said actuating means for providing a remote indication of operation of said closing means.

6. An automatic gate valve as defined in claim 5 and including pressure tap means for sampling the pressure in each of said first and second compartments.

7. An automatic gate valve as defined in claim 6 wherein said pressure tap means includes a differential pneumatic device for measuring the pressure differential between said compartments.

8. An automatic gate valve as defined in claim 7 and including drainage means for selectively draining liquids from either of said compartments.

9. An automatic gate valve as defined in claim 1 wherein said sections of pipe are electrical waveguides connected together at a junction formed by a fluid-tight membrane which is permeable to electric waves.

10. An automatic gate valve as defined in claim 1 wherein said spring biased lever arrangement comprises first and second connecting rods pivoted together at first ends thereof and pivotally connected intermediate the ends thereof to individual support means and at least one spring interconnecting points on said connecting rods on the side of said intermediate pivot points opposite said first ends, said float element being connected to the free end of one of said connecting rods, and said closing means including a needle valve connected at one end to the interconnected first ends of said first and second connecting rods.

* * * * *